Patented Oct. 16, 1928.

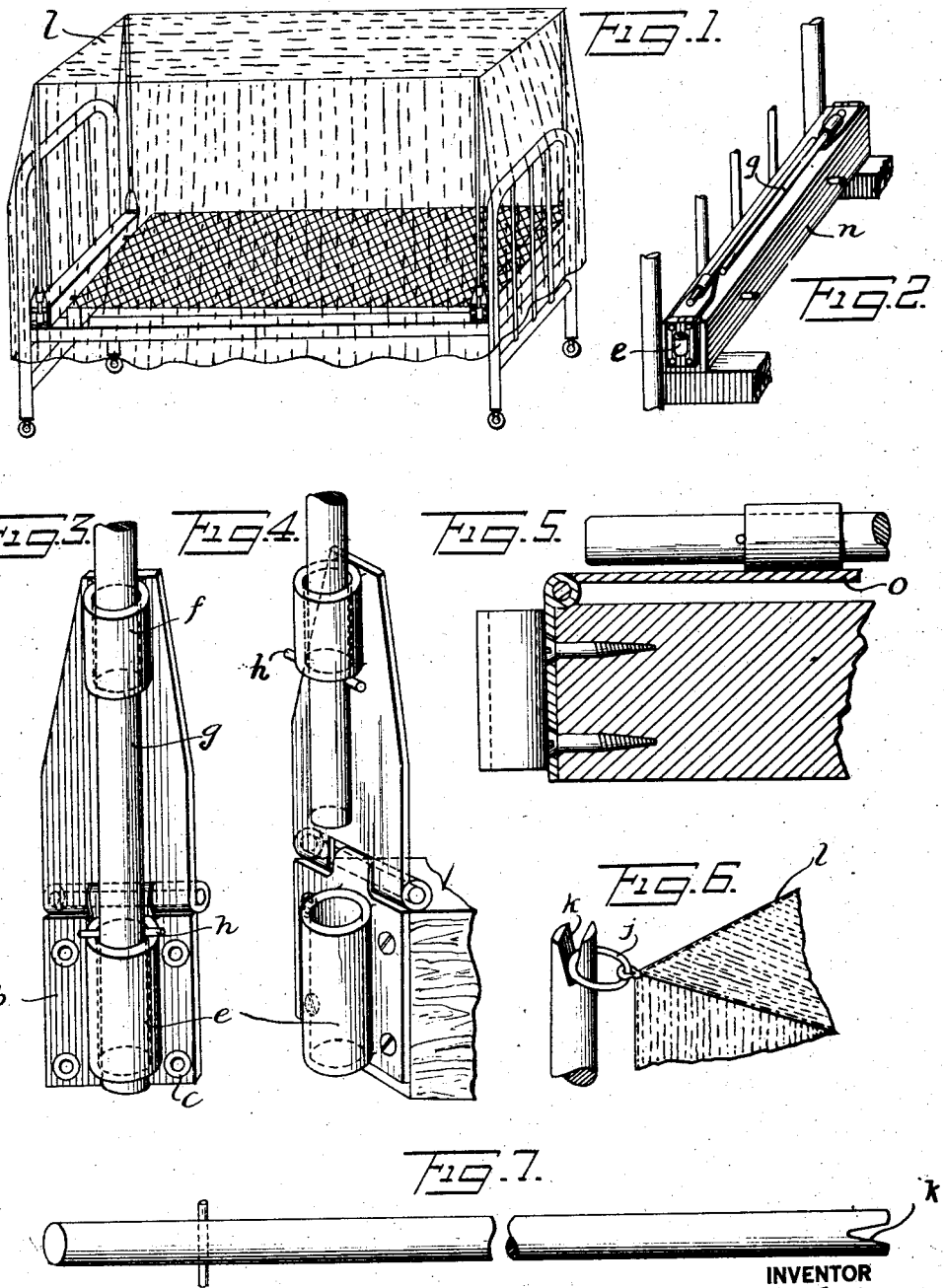

1,687,862

UNITED STATES PATENT OFFICE.

LUIS DE SENA Y FREIXAS, OF HABANA, CUBA.

MOSQUITO BAR (OR NET) CARRIER.

Application filed May 3, 1926, Serial No. 106,588, and in Cuba May 3, 1925.

This invention relates to a new or improved mosquito net carrier and has for its main object to provide a simple and sanitary structure which will satisfactorily fulfill the desired object.

For a full understanding of the present invention, reference will now be had to the accompanying drawing, in which:—

Figure 1 is a perspective view of the customary iron frame bed showing the present invention applied thereto.

Fig. 2 is a perspective view showing one of the head or cross pieces of the bed with two of the elements constituting the present invention folded down thereon.

Fig. 3 is a front view of a hinge element and associated rod employed according to the present invention.

Fig. 4 is a perspective view of the device shown in Fig. 3.

Fig. 5 is a longitudinal sectional view of part of Fig. 2 on a larger scale.

Fig. 6 is a side view showing the means of attaching the netting to the carrying rods, and, Fig. 7 is a side elevational view of one of the net carrying rods.

Referring more particularly to Figs. 3 and 4 of the drawings, it will be seen that each net carrying element comprises a hinge $b$ the two leaves of which are provided with sockets $e$ and $f$ respectively, said sockets being adapted to receive a rod $g$ the movement of which, with relation to such sockets, is adapted to be limited by a cross-pin $h$.

The upper extremity of the rod $g$ is provided with a recess $k$ which is adapted to receive and retain a ring $j$ to which in turn is secured one corner of the net $l$ to be supported (see Fig. 6).

As will be seen from Figs. 1, 2 and 5, one of the above-described elements is secured as by screws $c$, to each end of each of the two cross-pieces $n$ and $o$ of the bed, thus providing one element at each of the four corners of the bed.

In order that the two elements at either end of the bed can be folded down on top of the cross-pieces $n$ and $o$ respectively when the device is not in use, the must not be attached in line with one another, but so that their rods $g$ will lie down side by side transversely across the head and foot of the bed as will be clear from Fig. 2.

The operation of the present device will be clear without detailed description; to knock-down the device all that has to be done is to raise the rods $g$ until their lower ends are free of the lower leaves of the hinges (the pins $h$ being placed to permit this being done) and the upper leaves, together with their rods, are then turned down to the position shown in Figs. 2 and 5. To set up the device the reverse of these operations is of course necessary.

What I claim and desire to secure by Letters Patent is:—

1. A mosquito net carrier for beds comprising a fixed hinge member secured to each of the four corners of the bed, a movable hinge member pivoted to each of said fixed members, a net carrying rod movably connected to each movable hinge member, means whereby on the longitudinal raising of said rods the device can be folded down into its inoperative position and on the longitudinal lowering of said rods the device can be secured in its operative position, and means for attaching the net to said rods.

2. A mosquito net carrier for beds comprising a fixed hinge leaf secured to each of the four corners of the bed, a movable hinge leaf pivoted to each fixed leaf, a socket carried by each leaf of each hinge, and a net carrying rod adapted to slide in the sockets of each hinge, and to swing between vertical and horizontal positions each rod in its lowered vertical position engaging the two sockets thus holding the rod in its operative position and in its raised vertical position permitting the movable leaf of each hinge and the rod to be folded down transversely across the bed.

3. A net carrier for beds comprising a fixed hinge leaf secured to each of the ends of the crosspieces located at the head and foot of the bed respectively, a movable hinge leaf pivoted to each fixed leaf, a socket carried by each leaf of each hinge, a rod adapted to slide in the sockets of each hinge and to swing between vertical and horizontal positions, a cross pin on each rod located between the two sockets on each hinge and limiting the movement of the rod, and means for attaching the net to said rods, the two hinges located at the opposite ends of the head and foot cross-pieces respectively being offset with relation to each other so that the rods carried thereby can be folded down side by side transversely across the bed when the device is not in use.

In testiminy whereof, I have signed my name to this specification.

LUIS DE SENA Y FREIXAS.